United States Patent
Beyrich et al.

(10) Patent No.: US 9,482,193 B2
(45) Date of Patent: Nov. 1, 2016

(54) SYSTEM FOR ROTATIONALLY SECURELY PLUGGING A SENSOR INTO A THROUGH PASSAGE OF A FLOW CHANNEL

(71) Applicant: Robert Bosch GmbH, Stuttgart (DE)

(72) Inventors: Hans Beyrich, Freiberg/N (DE); Lutz Westenberger, Remseck (DE); Torsten Mais, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/495,169

(22) Filed: Sep. 24, 2014

(65) Prior Publication Data
US 2015/0082875 A1  Mar. 26, 2015

(30) Foreign Application Priority Data
Sep. 26, 2013  (DE) .................. 10 2013 219 399

(51) Int. Cl.
*F02M 35/10* (2006.01)
*G01F 15/18* (2006.01)
*G01F 1/684* (2006.01)

(52) U.S. Cl.
CPC . *F02M 35/10242* (2013.01); *F02M 35/10249* (2013.01); *F02M 35/10386* (2013.01); *G01F 1/684* (2013.01); *G01F 15/18* (2013.01); *G01F 15/185* (2013.01)

(58) Field of Classification Search
CPC ...... G01F 15/18; G01F 15/185; G01F 1/684; G01F 5/00; F02D 41/18; F02M 35/10242; F02M 35/10249; F02M 35/10386; G01D 11/245
USPC ....................................... 73/114.32
See application file for complete search history.

(56) References Cited

U.S. PATENT DOCUMENTS

| 6,805,002 | B2 * | 10/2004 | Yonezawa | G01F 15/18 73/204.22 |
|---|---|---|---|---|
| 7,171,865 | B2 * | 2/2007 | Hueftle | G01D 11/30 73/866.5 |
| 7,530,267 | B2 * | 5/2009 | Uramachi | G01F 1/6842 73/202.5 |
| 7,805,990 | B2 | 10/2010 | Lang et al. | |
| 9,163,964 | B2 * | 10/2015 | Schneider | G01F 1/00 |
| 2013/0269419 | A1 * | 10/2013 | Etherington | G01F 1/692 73/37 |

FOREIGN PATENT DOCUMENTS

DE   102011078992 A1   1/2013

\* cited by examiner

*Primary Examiner* — Freddie Kirkland, III
(74) *Attorney, Agent, or Firm* — Norton Rose Fulbright US LLP

(57) ABSTRACT

A system for rotationally securely plugging a sensor into a through-passage of a flow channel, the sensor including a sensor housing, the through-passage having an inner wall delimiting the through-passage and first and second inside diameters extending respectively along a first axis and a second axis, perpendicular to the first axis, the first inside diameter being greater than the second inside diameter, a plug-in direction of the sensor housing into the through-passage defining a third axis essentially perpendicular to the first and second axis, the sensor housing having a longitudinal extension area along the third axis and being insertable into the through-passage. To ensure rotationally secure assembly of the sensor in its setpoint angular position, at least one protrusion is provided so that the sensor housing, in a plugged-in state, is rotatable in the through-passage by no more than 0.5° about the third axis.

10 Claims, 8 Drawing Sheets

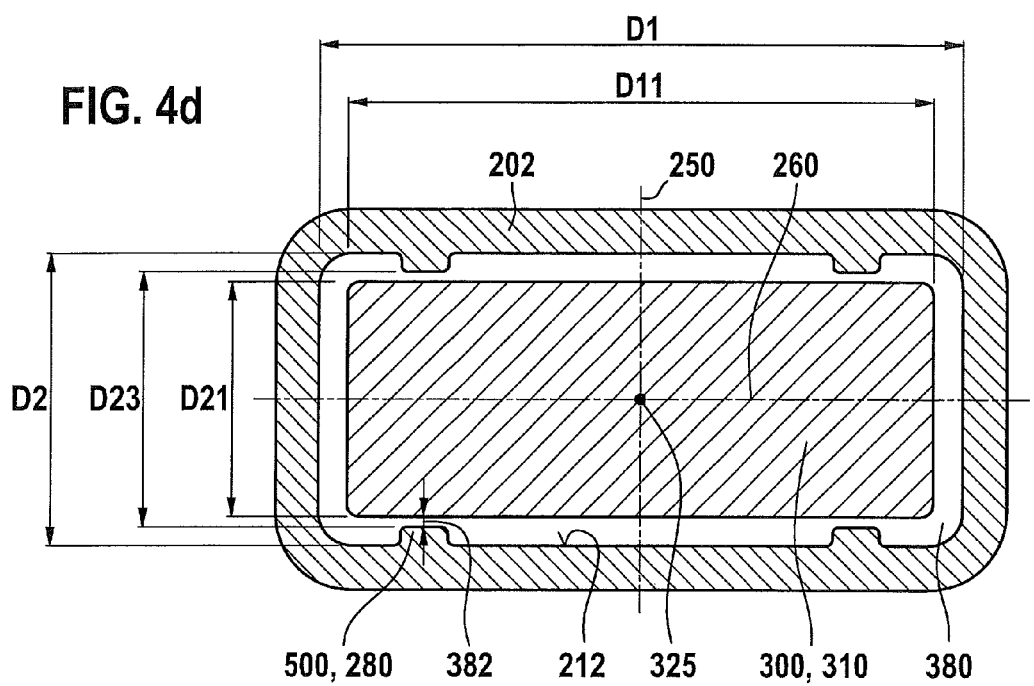

SYSTEM FOR ROTATIONALLY SECURELY PLUGGING A SENSOR INTO A THROUGH PASSAGE OF A FLOW CHANNEL

RELATED APPLICATION INFORMATION

The present application claims priority to and the benefit of German patent application no. 10 2013 219399.8, which was filed in Germany on Sep. 26, 2013, the disclosure of which is incorporated herein by reference.

FIELD OF THE INVENTION

The present invention relates to a system for rotationally securely plugging a sensor into a through-passage of a flow channel having the features of the definition of the species in the independent device claim. The present invention further relates to the use of such a system in a sensor system for detecting the air mass flowing in a channel.

BACKGROUND INFORMATION

Sensors which detect the air mass of the air flowing in the intake manifold of the internal combustion engine, so-called air mass flow sensors, are frequently used in the intake manifold to optimize the combustion process of internal combustion engines, for example in motor vehicles. In addition to the intrinsic measuring accuracy of the sensor or the sensor element which is used, and in addition to the further detection of properties of the flowing air mass, such as the temperature or the humidity, the accuracy of the air mass determination also depends on the installation situation of the air mass flow sensor. Here in particular the angular orientation of the air mass flow sensor relative to the air mass flow to be detected plays a decisive role. The more precisely the angle of the air mass flow sensor with respect to the air mass flow agrees during installation into the intake manifold with the setpoint angle for which the sensor measuring values have been calibrated, the more reliable is the determined air mass, and the better may the combustion behavior in the internal combustion engine be optimized.

At the same time, it is frequently necessary in practice to configure the air mass flow sensor configured as a plug-in element into the intake manifold in such a way that the air mass flow sensor may be plugged in together with the intake manifold in a short time and in what may be a simple manner during production. For this purpose, the air mass flow sensor is frequently plugged into a through-passage of the intake manifold, the dimensions of the through-passage being deliberately configured to be greater on all sides than the outer contour of the air mass flow sensor to thus make it easier to plug in the air mass flow sensor. During assembly, the air mass flow sensor is plugged into the intake manifold through the through-passage and, at the end of the plug-in process, an attachment area situated on the air mass flow sensor makes contact with a base of the intake manifold. There, the sensor is then connected to the attachment base, for example, by a screw joint of the attachment area. A sealant situated between the attachment section and the attachment base ensures fluid-tight sealing. However, since the through-passage has a larger dimension than the outer contour of the air mass flow sensor, it is possible for the air mass flow sensor to be variably rotatable regarding its setpoint angular position with respect to the air mass flowing in the intake manifold, and is thus subject to relatively large production fluctuations or production tolerances with respect to its setpoint angular position. As a result, the air mass becomes less accurately detectable. The deviation from the setpoint angular position may thus be up to 2°, or even 2.5°, regarding a rotation about the z-axis extending in the plug-in direction.

An air mass flow sensor system is known from U.S. Pat. No. 7,805,990 B2, in which the assembly of the air mass flow sensor is to be ensured with what may be small production tolerances regarding the setpoint angular position in the intake manifold by using multiple guide notches offset from each other in the outer area of the attachment base. Guide pins, which correspond to the guide notches and are situated on the attachment area of the air mass flow sensor, engage in these guide notches, whereby the air mass flow sensor is to be situated in its correct angular position in the intake manifold.

However, it has been found that such guide notches on the attachment base create a contour on which other objects may become entangled. Similarly, the guide pins projecting from the attachment area of the air mass flow sensor in the plug-in direction may become damaged during handling or during transport, so that they are no longer able to fulfill their function, or other objects may become entangled in these projecting guide pins.

SUMMARY OF THE INVENTION

According to the present invention, a system for rotationally securely plugging a sensor into a through-passage of a flow channel is proposed, the sensor including a sensor housing, the through-passage having an inner wall delimiting the through-passage, the through-passage having a first inside diameter extending along a first axis and a second inside diameter extending along a second axis which is perpendicular to the first axis, the first inside diameter being greater than the second inside diameter, the plug-in direction of the sensor housing into the through-passage defining a third axis which is essentially perpendicular to the first axis and the second axis, the sensor housing having a longitudinal extension area along the third axis, the longitudinal extension area having an outer wall, the sensor housing being pluggable into the through-passage. According to the present invention, at least one protrusion projecting inwardly into the through-passage by a defined dimension is provided on the inner wall of the through-passage and/or at least one protrusion projecting outwardly by a defined dimension is provided on the outer wall of the longitudinal extension area of the sensor housing in such a way that the sensor housing, in the plugged-in state, is rotatable in the through-passage by no more than 0.5°, in particular by no more than 0.35°, about the z-axis.

The system according to the present invention has the advantage over the related art that it is possible to situate the sensor, for example an air mass flow sensor, within a very small tolerance range around its optimal position or angular position with respect to a rotation about the z-axis when plugging it into the through-passage due to the at least one protrusion. In other words, the degree of rotational freedom of the sensor regarding a rotation about the z-axis is severely limited by the protrusions acting as stops with respect to a rotation about the z-axis, for example, to a maximal rotation of 0.5°, which may be no more than 0.35°, most particularly maximally 0.15° or maximally 0.2° compared to its setpoint angular position. The setpoint angular position results as a rotation angle position of the sensor about the z-axis, which results in an optimal orientation of the sensor with respect to the flow direction in the flow channel, for example, the rotation angle position in which the sensor was calibrated. It is particularly advantageous that the at least one protrusion acting as a stop against the rotation of the sensor acts not only as a rotation stop when the sensor is being plugged in, but also with rotatory forces acting about the z-axis during final assembly, for example when screwing the sensor to the flow channel.

This advantageously considerably simplifies the assembly of the sensor on the flow channel since in this way, for example, due to a screw joint, there is no longer any influence on the angular position, for example due to inadvertent rotation of the sensor with respect to the through-passage. In this way it is easy to move the sensor which has been plugged into the through-passage to another production station, in which the screw joint is carried out, for example, so that thereby the final angle position deviates compared to the setpoint angular position at most by a tolerance degree of less than 0.5°, which may be less than 0.35°, most particularly less than 0.2° or less than 0.15°. The sensor according to the present invention may be any arbitrary sensor which is suitable for detecting at least one property of a fluid flowing in the flow channel, such as the temperature, the pressure, the dynamic pressure, the humidity or the air mass. The fluid is particularly advantageously a gas, most particularly advantageously it is air.

The use of a system according to the present invention for rotationally securely plugging a sensor into a through-passage of a flow channel for detecting the air mass flowing in the channel has the advantage over the related art that, with the aid of the at least one protrusion, the angular orientation of the sensor about the z-axis with respect to the through-passage satisfies very high tolerance requirements (i.e., low tolerance values) in a simple manner. This is achieved in that the particular required setpoint value reliably adjusts basically automatically during the plug-in process with only minor production-related tolerance deviations by the at least one protrusion, as a rotation stop, limiting the degree of rotational freedom of a rotation about the z-axis. The use of the system is thus also suitable in particular in mass production and causes there particularly low testing complexity, i.e., it is particularly cost-efficient. Due to this simple measure in the angular orientation of the sensor, advantageously a deviation from the setpoint angular position by a tolerance degree of, for example, less than 0.5° is achieved, particularly advantageously a deviation of the angular position compared to the setpoint angle position by a tolerance degree of less than 0.35° is achieved. This results in extremely high precision of the air mass detection in the flow channel.

The angular position in the context of the present application shall be understood to mean the rotational position of the sensor with regard to a rotation of the sensor about an axis parallel to the longitudinal extension direction or the plug-in direction of the sensor.

Compared to the related art, which, for example, is characterized by a singular centering pin which is configured in a pin-like manner and projects away from the attachment base or from the sensor housing, the system according to the present invention for rotationally securely plugging a sensor into a through-passage of a flow channel has the advantage that entangling of or with other objects or damage of the at least one protrusion during assembly and transport is largely precluded, for example, due to the at least one protrusion projecting from an inner wall of the through-passage. The risk of becoming damaged by transport or assembly processes, or of becoming entangled with other objects, is also particularly advantageously reduced for a protrusion which projects away, for example, from the outer wall of the longitudinal extension area of the sensor housing. The reason for this is that such a protrusion is joined, for example on at least one of its sides, gap-free to the sensor housing (or is joined gap-free to the inner wall of the through-passage) or protrudes directly from the sensor housing (or the inner wall of the through-passage) and is precisely not a singular projecting pin-like centering pin. Entangling with large lever effects acting on the protrusion is thus less likely. Contrary to a singular centering pin, a potential application of force on the protrusion is also distributed over a larger area due to the connection to the sensor wall across a large area, which makes damage due to tearing less likely. In this way, a particularly low reject rate in production and particularly reliable angular positioning of the sensor with respect to the setpoint angle during assembly of the sensor in the through-passage are achieved.

A further advantage of the present invention is that a particularly simple and reliable production of the at least one protrusion is made possible by situating the at least one protrusion on the inner wall of the through-passage and/or on the outer wall of the longitudinal extension area of the sensor housing. This is done, for example, with the aid of an injection molding process, particularly advantageously with the aid of a one-component injection molding process, in which the at least one protrusion is configured in one piece with the inner wall of the through-passage and/or with the outer wall of the longitudinal extension area of the sensor housing. Compared to guide pins singularly projecting, for example, in the plug-in direction from an attachment area, in this way, for example, a particularly simple and controlled demolding process or ejection process from a production tool, for example an injection molding tool, is possible.

Advantageous embodiments and refinements of the present invention result from the features and measures which are specified in the dependent claims.

As a result of the at least one protrusion on the inner wall of the through-passage being situated on at least one inner wall surface extending along the first axis and the third axis and/or as a result of the at least one protrusion on the outer wall of the longitudinal extension area of the sensor housing being situated on at least one outer wall surface extending along the first axis and the third axis, the at least one protrusion may advantageously be configured and manufactured in a particularly simple manner, such as with the aid of an injection molding process. It is further advantageous that the at least one protrusion may thus be formed over a longer extension area, so that it provides a particularly advantageous and reliably acting, wear-resistant stop against rotation. By situating the at least one protrusion along the first axis, the orientation action is particularly advantageously supported in that the first inside diameter of the through-passage along the first axis is greater than the second inside diameter along the second axis. The sensor housing thus already makes contact with the at least one protrusion on the inner wall of the through-passage, or the at least one protrusion of the outer wall of the sensor housing makes contact with the inner wall of the through-passage, with only a small rotation of the sensor about the z-axis, whereby a further rotation of the sensor about the z-axis is counteracted.

In one advantageous specific embodiment, the defined dimension is 200 micrometers or more, for example. In other words, the at least one protrusion thus projects inwardly by 200 μm or more from the inner wall of the through-passage into the through-passage, or the at least one protrusion projects outwardly by 200 μm or more away from the outer wall of the longitudinal extension area of the sensor housing.

This advantageously causes an undesirable rotation of the sensor out of its setpoint angular position after only a particularly small rotation to be prevented with the aid of the stop action of the at least one protrusion. The reason for this is that the dimensions of the through-passage with respect to the first and the second axis are typically in each case approximately 150 µm to approximately 700 µm, which may be 250 µm to approximately 550 µm, greater than the extension of the longitudinal extension area of the sensor or of the sensor housing along the first axis and the second axis. By the at least one protrusion projecting by 200 µm or more from the inner wall of the through-passage into the through-passage or projecting outwardly from the outer wall of the longitudinal extension area of the sensor housing, reliable angular orientation with only a small tolerance deviation of the sensor compared to its setpoint angular position in the through-passage is thus achieved. With narrower tolerances between the dimensions of the through-passage and the dimensions of the longitudinal extension area of the sensor, the defined degree may also be smaller and, for example, be at least 100 micrometers or at least 150 micrometers.

Overall—when the sensor is situated in the setpoint angular position in the through-passage—the at least one protrusion causes a centering gap between the sensor housing and the through-passage at the location of the at least one protrusion having a gap dimension of no more than approximately 50 µm to no more than 150 µm, whereby a possible deviation from the setpoint angular position of less than 0.5°, or even less than 0.35°, is made possible. The gap dimension may be large enough for the sensor not to become jammed in the through-passage, i.e., the contour of the inner wall of the through-passage at all locations is located outside the outer contour of the sensor housing when the sensor is plugged into the through-passage in its setpoint angular position.

As a result of the at least one protrusion extending by 1 mm or more along the third axis, the sensor may be situated and fixed in the through-passage particularly reliably in the small tolerance range about its setpoint angular position with the aid of the at least one protrusion. The reason for this is that the at least one protrusion becomes more robust against mechanical damage or plastic deformations, for example, during repeated plugging into the through-passage, the longer the at least one protrusion is configured, at the same width, which is situated between the sensor and the through-passage and acts as a rotation stop.

At the same time, viewed in sections along the z-axis, manufacturing-related tolerances in the dimensions of the through-passage along the first or second axis, or along the longitudinal extension area of the sensor along the first or the second axis, then advantageously have a lesser impact on the effect of the at least one protrusion as a rotation angle stop. This, in turn, allows a smaller tolerance of the sensor regarding its setpoint angular position.

One refinement of the present invention provides for at least two protrusions to be provided. This causes a particularly reliable and precise orientation of the sensor in the through-passage. This also reduces the risk that the desired small tolerance degree with regard to the setpoint angular position is no longer achievable in the event of damage to a protrusion, for example, due to a plastic deformation during the plug-in process, since a certain redundant configuration is created by at least one further protrusion.

In one advantageous refinement of the present invention, the at least two protrusions are in each case provided on the inner wall of the through-passage or on the outer wall of the longitudinal extension area of the sensor housing, the at least two protrusions being spaced apart from each other, viewed along the first axis, by a distance dimension which is greater than half the first inside diameter. This refinement advantageously causes a particularly rotationally secure orientation of the sensor in the through-passage, regardless at which location of the sensor rotatory forces are applied to the sensor with regard to a rotation about the third axis. In this way a particularly small tolerance degree of the angular position of the sensor with regard to its setpoint angular position, i.e., regarding its orientation relative to the flow direction in the flow channel, in the arrangement of the sensor in the through-passage is achieved, and thus the measuring accuracy of the sensor is advantageously improved.

As a result of the at least one protrusion having an insertion taper along the plug-in direction, during production the sensor may advantageously be inserted or plugged into the through-passage up to its final position particularly easily, quickly and protected from entanglement. The insertion taper, which is configured in a wedge shape, for example, thus represents an insertion aid. Moreover, the insertion taper advantageously causes the positioning of the sensor in its setpoint final position to extend over a larger distance of the sensor in the plug-in direction during the plug-in process, and thus causes the sensor to glide smoothly into its final angular position. In other words, the insertion taper of the at least one protrusion at least partially transforms the movement of the sensor in its plug-in direction into a lateral movement which is perpendicular to the plug-in direction, or into a rotatory movement about the z-axis, as a result of which the sensor is pushed into its final angular position deviating from its setpoint angular position by no more than a small tolerance degree. The insertion taper thus causes continuous centering or self-centering or orientation of the sensor or of the sensor housing in the through-passage during the plug-in process.

One advantageous refinement of the present invention provides for the at least two protrusions on the inner wall of the through-passage to be situated on a line which is parallel to the direction of the second axis and/or for the at least two protrusions on the outer wall of the longitudinal extension area of the sensor housing to be situated on a line which is parallel to the direction of the second axis. This advantageously causes the at least two protrusions to be situated opposite each other along the second axis, whereby a particularly simple and effective orientation of the sensor in its setpoint angular position, or only a small deviation of the sensor from its setpoint angular position, is achieved. It is also possible, for example, that the overall at least two protrusions are situated both on the inner wall of the through-passage and on the outer wall of the longitudinal extension of the sensor, i.e., one protrusion on the inner wall and one further protrusion on the outer wall, for example.

Specific embodiments of the present invention are shown in the drawings and are described in greater detail in the following description.

BRIEF DESCRIPTION OF THE DRAWINGS

FIG. 3b shows a perspective view of a protrusion according to section IIIb from FIG. 3a.

FIG. 4d shows a cross section through the through-passage of the second exemplary embodiment with the plugged-in sensor in the setpoint angle position.

DETAILED DESCRIPTION

Figure 1:
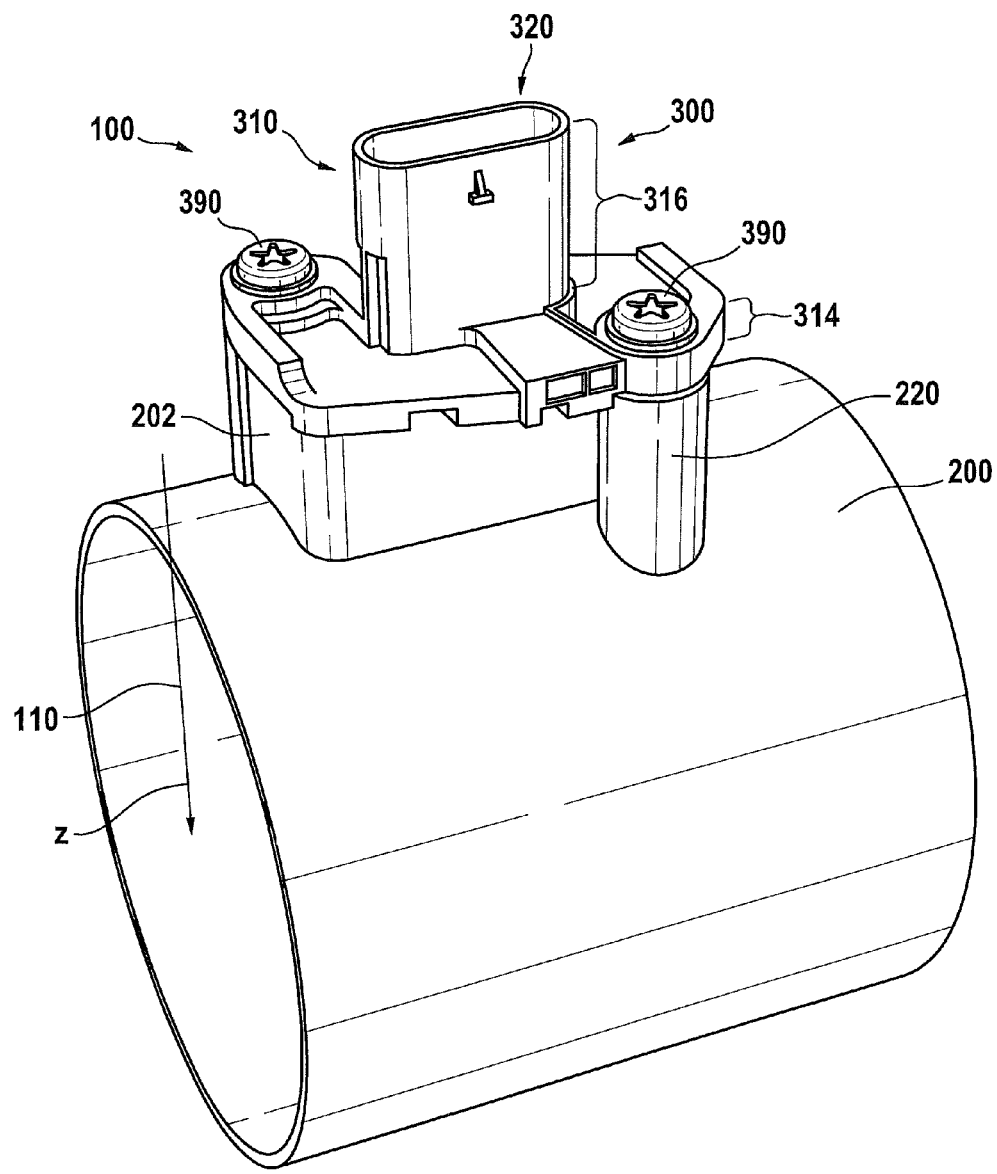
FIG. 1 shows a perspective view of a system according to the present invention for rotationally securely plugging a sensor into a through-passage of a flow channel in the plugged-together and assembled state.

In the reference numerals used in the drawings, elements having identical functions have identical reference numerals.

Figure 2:
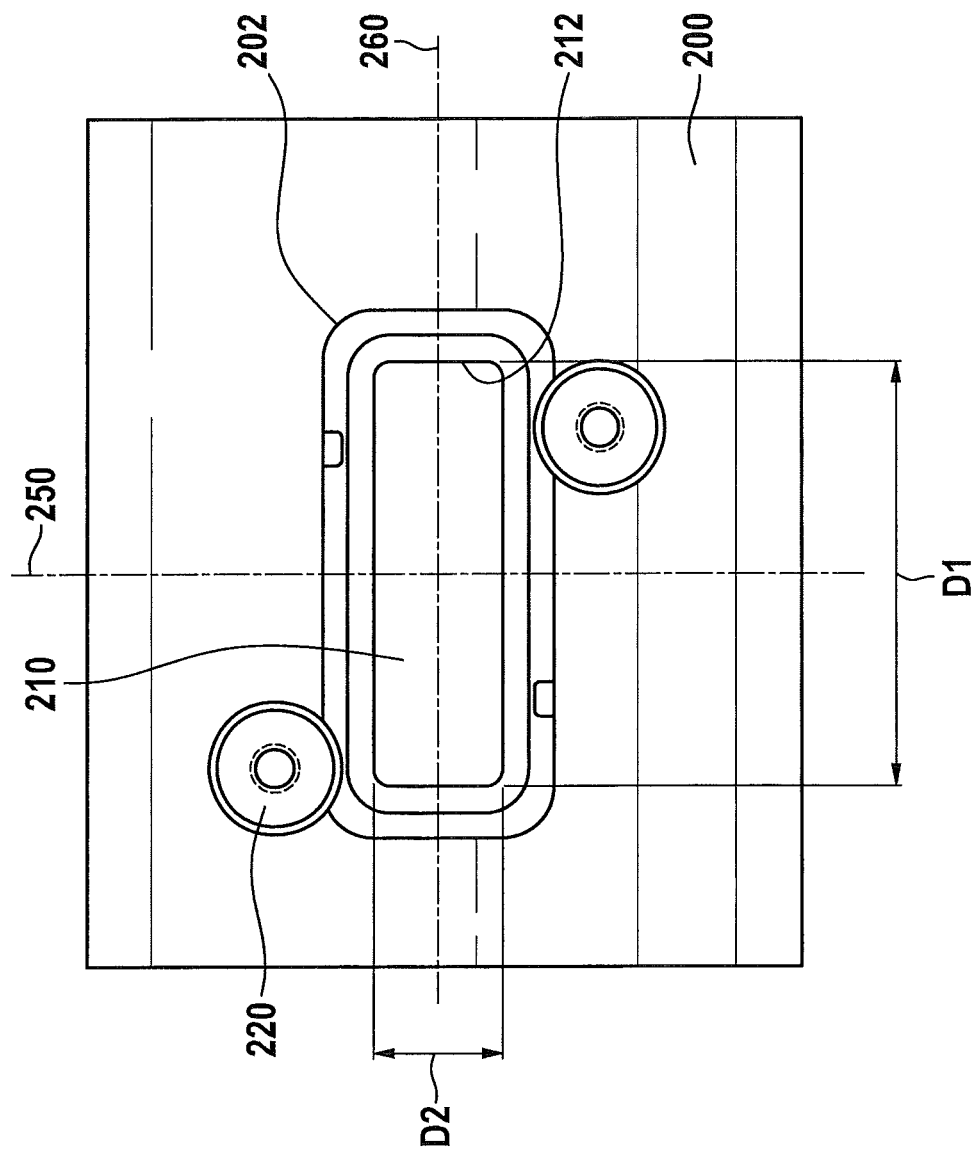
FIG. 2 shows a view onto a through-passage in a flow channel of a system according to the present invention for rotationally securely plugging in a sensor according to a first exemplary embodiment.

FIGS. 1 and 2 show a system 100 according to the present invention for rotationally securely plugging a sensor 300 into a through-passage 210 of a flow channel 200. FIG. 1 shows the fully assembled state of system 100. A fluid medium, such as a gas, which may be air, is able to flow through flow channel 200, which may be configured to be hollow-cylindrical having, for example, a circular or elliptic diameter. A base 202, through which through-passage 210 extends from the outer side of base 202 or of flow channel 200 to the interior of flow channel 200, is situated on flow channel 200. Through-passage 210 has an essentially rectangular cross-sectional surface by way of example in the shown exemplary embodiment. Through-passage 210 has a first inside diameter (D1) extending along a first axis 260 and a second inside diameter (D2) extending along a second axis 250, second axis 250 being perpendicular to first axis 260. For example, first inside diameter (D1) is greater than second inside diameter (D2).

Two attachment bases 220, which have a circular cross section and in each case have a centric borehole, are situated diagonally opposite each other with respect to the center of through-passage 210 at the two outer sides of the base facing away from through-passage 210 along the extension direction of first axis 260. Screws 390 may be screwed into the boreholes to thus fix sensor 300 against movements along its plug-in direction (z) on flow channel 200 or on base 202. Plug-in direction (z) of sensor 300 through through-passage 210 or the plug-in opening defines a third axis 110, which is essentially perpendicular with respect to first axis 260 and second axis 250. Through-passage 210 has an inner wall 212 delimiting through-passage 210, inner wall 212 being formed partially by flow channel 200 and partially by base 202.

Figure 3A:
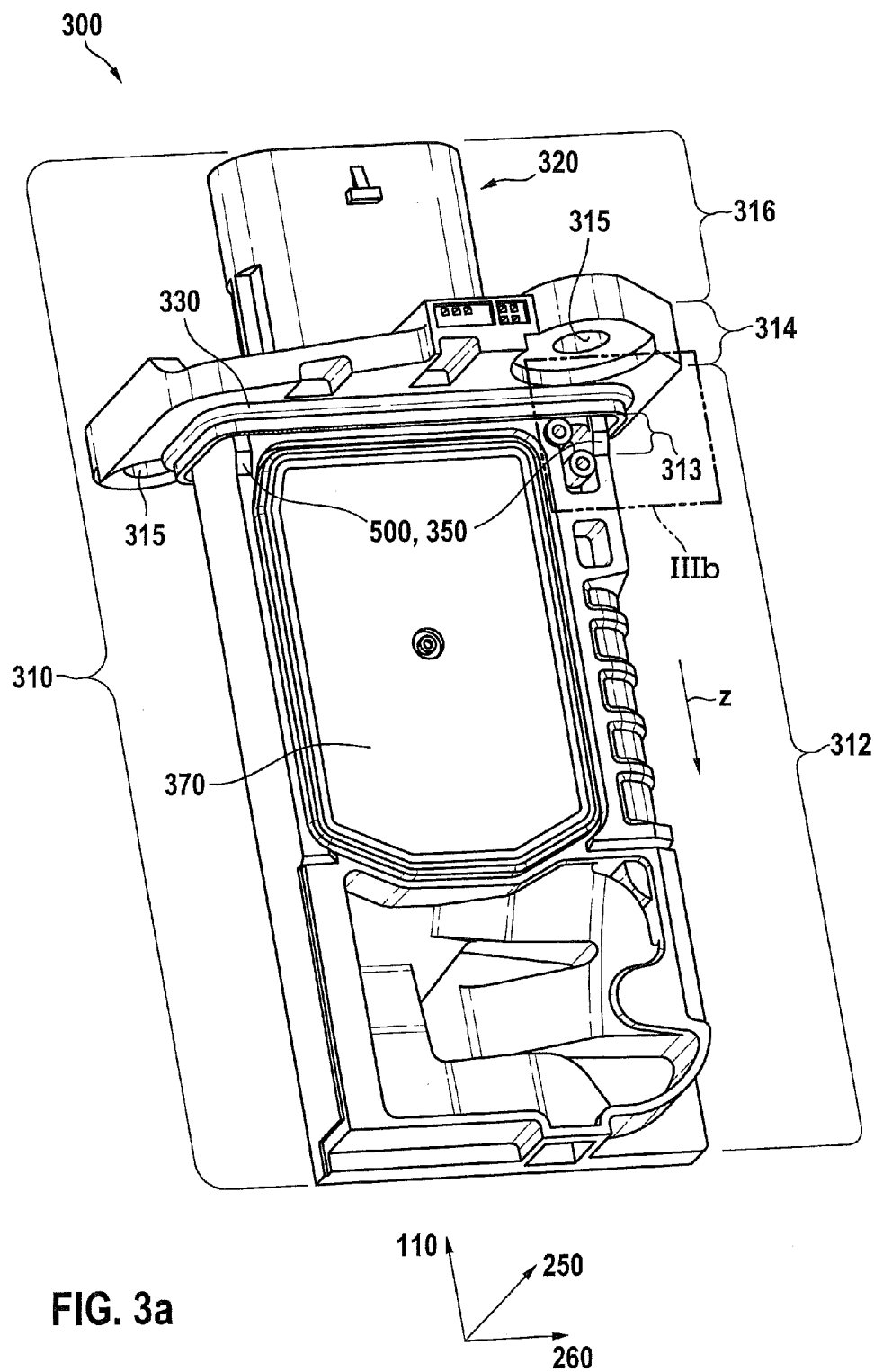
FIG. 3a shows a perspective view of a sensor of the system according to the present invention for rotationally securely plugging in a sensor according to the first exemplary embodiment.

FIG. 3a shows sensor 300, which may be plugged into the through-passage of FIG. 2, for example, and in the plugged-together state then forms a system according to FIG. 1. Sensor 300 includes a sensor housing 310 having an outer wall 370. Sensor housing 310 is divided into three areas 312, 314, 316 along plug-in direction (z). In the state when the sensor is plugged into flow channel 200 and fully assembled, a longitudinal extension area 312 is completely situated in the interior of flow channel 200 or in the interior of base 202 on one end along plug-in direction (z) of sensor 300.

A connector area 316 having a connector housing 320 is situated at the end of the sensor facing away from plug-in direction (z) and is situated completely outside flow channel 200 or base 202 and projects radially outwardly from flow channel 200 or from base 202, for example, in the fully assembled state. One or multiple contact element/elements (not shown) is/are situated in connector housing 320, which may be contacted with the aid of a mating connector (not shown). By connecting the mating connector to the contact elements or contact pins of connector area 316, for example, electric or electronic signals of sensor 300 may be transmitted to a control unit, or sensor 300 may be supplied with electric voltage or electrical current from outside.

An attachment area 314 is situated on sensor housing 310 between longitudinal extension area 312 and connector area 316 along plug-in direction (z). In attachment area 314, connector housing 310 is configured, for example, in the manner of a flange which protrudes transversely to plug-in direction (z) beyond the outer contour of longitudinal extension area 312. Attachment area 314 configured as a flange, for example, is configured in such a way that attachment area 314 covers and closes through-passage 210 and base 202 as well as two attachment bases 220. Corresponding to two attachment bases 220, two openings 315 situated diagonally opposite each other are provided in attachment area 314 of sensor housing 310. Sensor housing 310 may be fixed to flow channel 200 or to base 202 with the aid of two attachment arrangements, for example, screws, which are placed through openings 315 and screwed to attachment base 220. By attaching, for example, screwing on, attachment area 314, sensor housing 310 of sensor 300 is securely fixed against movements along or counter to plug-in direction (z) on flow channel 200 or on base 202. At the same time, sensor 300 or sensor housing 310 is sealed in a fluid-tight manner with respect to flow channel 200 or with respect to base 202 with the aid of the screw joint or by attachment using another attachment arrangement. Sealing is supported by a sealant 330, which is situated peripherally around sensor housing 310, for example. Sealant 330 may be situated at the end of longitudinal extension area 312 facing attachment area 314. In other words, i.e., in the assembled state, it is situated between attachment area 314 of sensor 300 and the end-face, outwardly facing edge of the wall of base 202 or of flow channel 200 delimiting through-passage 210.

To configuration the plug-in process of sensor housing 310 into through-passage 210 in a controlled, i.e., which may be friction-free and simple, manner, through-passage 210 may be configured in such a way that its surface, in the cross section transversely to plug-in direction (z), completely covers any arbitrary cross-sectional surface of longitudinal extension area 312 of sensor housing 310, at least provided that the sensor housing is situated in the through-passage in a setpoint angular position with respect to a rotation about the z-axis, i.e., the third axis. This applies to protrusion area 313, which is situated in longitudinal extension area 312 directly adjoining attachment area 314. In the shown exemplary embodiment, outwardly projecting protrusions 500, 350 are situated in protrusion area 313 at the ends of the lateral surfaces of outer wall 370 of sensor housing 310 which extend along first axis 260. Protrusions 500, 350 extend along plug-in direction (z) over a length of at least 1 mm, which may be over a least 3 mm. Their width along the first axis is at least 0.3 mm, which may be at least 0.8 mm, most particularly at least 1.5 mm. In protrusion area 313, the cross section of the through-passage in the area of protrusions 500, 350 thus no longer covers the cross section of sensor housing 310 to the same extent as in the remaining longitudinal extension area 312. The reason for this is that the diameter of sensor housing 310 is widened along second axis 250 in the area of protrusions 500, 350 and approaches second inside diameter (D2) of through-passage 210.

Figure 3B:
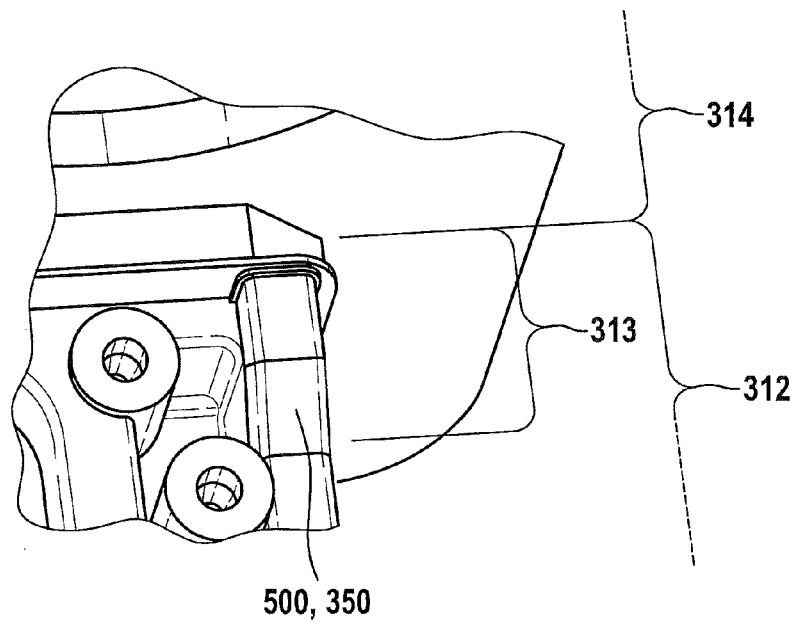

As is shown in FIG. 3b, in the shown exemplary embodiment protrusions 500, 350 are configured as overhangs which initially project in a wedge shape, i.e., increasing outwardly, viewed from the end of longitudinal extension area 312 which is pluggable into through-passage 210 toward attachment area 314, the width or depth of the overhang extending here along second axis 250. At the end of the wedge-shaped section, these protrusions 500, 350 extend essentially in parallel to third axis 110. Up to attachment area 314 configured as a kind of flange, for example, protrusions 500, 350 may extend continuously or may have a notch for situating sealant 330 between themselves and attachment area 314.

The wedge shape of protrusions 500, 350 may have a different slope or steepness. It is used as a kind of insertion taper, with the aid of which orientation or centering of sensor housing 310 in its setpoint angular position, or in a final angular position deviating from the setpoint angular position only by a small tolerance degree, in through-passage 210 is caused automatically at the end of the plug-in process. At the same time, the insertion taper facilitates the plug-in process. This is caused by the cross sections through sensor housing 310 along plug-in direction (z) at the location of protrusions 500, 350 having a steadily increasing diameter of sensor housing 310 along second axis 250. This diameter of the sensor housing increasingly approaches second inside diameter (D2), so that the centering of the sensor housing with regard to its setpoint angular position increasingly improves during the plug-in process. The insertion taper acts as an orientation aid by converting a movement in plug-in direction (z) along third axis 110 into a centering movement, for example, regarding a rotational orientation with respect to third axis 110, i.e., the z-axis.

Starting at the position along plug-in direction (z) at which protrusions 500, 350 have reached their final protrusion overhang, sensor housing 310 is definitively oriented or centered in its final angular position and is thus only rotatable about its setpoint angular position in a very small angular range of, for example, 0.35° or 0.15°. In other words, starting at this point in time or starting at this waypoint, the angular position of sensor housing 310 with respect to through-passage 210 is fixed in a rotationally secure manner to the defined tolerance degree.

In one specific embodiment, which is not shown here, protrusions 500, 350 having insertion tapers are also provided along the extension direction of second axis 250 on outer wall 370 of sensor housing 310, so that sensor housing 310 may also be centered along first axis 260 during the plug-in process, which automatically ensures the positioning of the sensor with respect to attachment bases 220 and thereby facilitates assembly.

In other specific embodiments, for example, only a single protrusion 500 is provided.

In their section which is no longer wedge-shaped, protrusions 500, 350 in each case may project outwardly from outer wall 370 of the sensor housing by at least 0.1 mm, particularly by at least 0.2 mm (relative to the areas of outer wall 370 which directly adjoin protrusions 500, 350). It is advantageous that protrusions 500, 350 increase the diameter of sensor housing 310 at the location of protrusions 500, 350 in the plugged-in state to a protrusion diameter (D22), see FIG. 3d, in such a way that this protrusion diameter (D22) almost reaches second inside diameter (D2) or first inside diameter (D1) of through-passage 210, and that at this location only a small centering gap 382 (FIG. 3e) remains between sensor housing 310 and through-passage 210, for example, centering gap 382 ends up narrower than a plug-in gap 380 remaining at the other locations of through-passage 210 between its outer wall 312 and outer wall 370 of sensor 300.

Figure 3C:
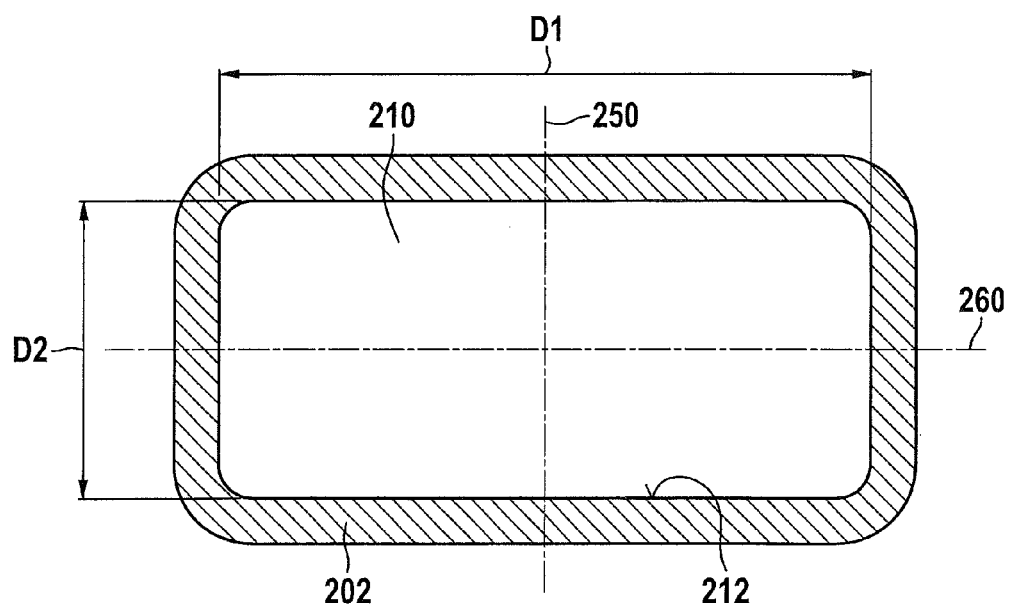
FIG. 3c shows a cross section through the through-passage of the first exemplary embodiment in the state without the assembled sensor.

FIG. 3c shows a cross section transversely to plug-in direction (z) through through-passage 210 in the area of base 202. The top portion of the figure shows through-passage 210 in the state prior to plugging in sensor 300. The through-passage has first diameter (D1) along first axis 260 and second diameter (D2) along second axis 250.

Figure 3D:
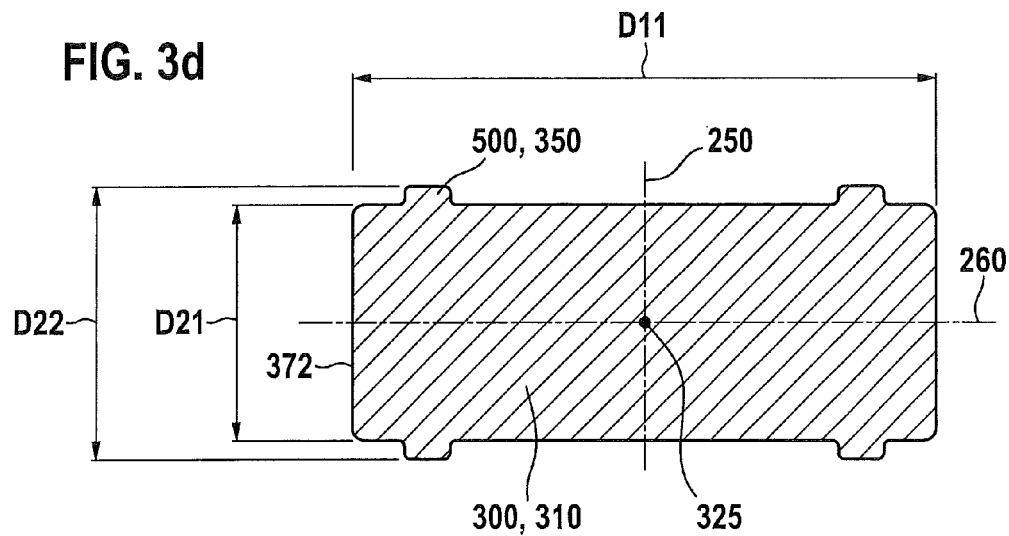
FIG. 3d shows a cross section through the sensor housing of the first exemplary embodiment.

FIG. 3d shows a cross section of sensor 300 or of sensor housing 310 transversely to third axis 110 in the plane of protrusion area 313. The sensor housing has a first sensor diameter (D21) along first axis 260 and a second sensor diameter (D22) along second axis 250. Also shown in the figure is a rotation center 325 of sensor 300 which extends through the longitudinal axis of sensor 310. When the sensor is plugged into through-passage 210, the malposition of the sensor in its final angular position compared to its setpoint angular position refers to a rotation of sensor 300 about rotation center 325, for example.

Figure 3E:
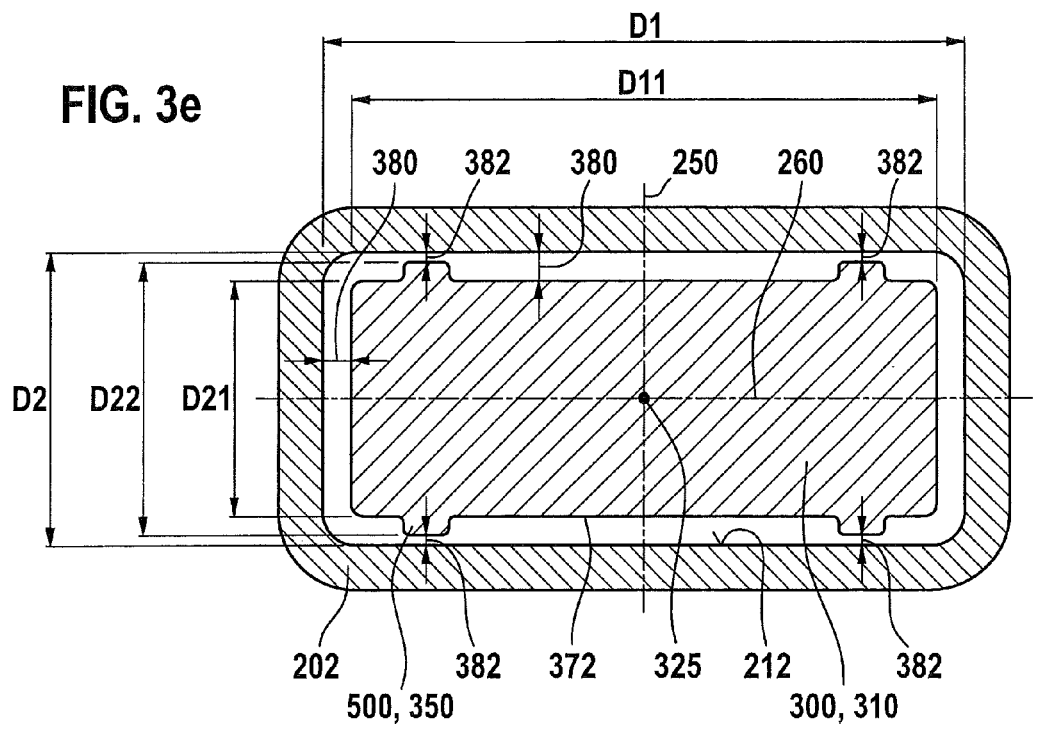
FIG. 3e shows a cross section through the through-passage of the first exemplary embodiment with the plugged-in sensor in the setpoint angular position.

FIG. 3e shows through-passage 210 with plugged-in sensor 300 in the fully assembled state, sensor 300 being situated in its setpoint position in through-passage 210. A plug-in gap 380, which ideally has a first gap dimension having a uniform width at all locations (except at the location of protrusions 500, 350), extends between inner wall 212 of through-passage 210 and sensor 300.

In FIG. 3e, a uniform first gap dimension is defined at every location for a cutting plane transversely to first axis 260 as half the difference between second inside diameter (D2) of through-passage 210 and second sensor diameter (D21), i.e., (D2-D21)/2. Similarly, a uniform first gap dimension is defined at every location for a cutting plane transversely to second axis 250 as half the difference between first inside diameter (D1) of through-passage 210 and first sensor diameter (D11), i.e., (D1-D11)/2.

In contrast, a centering gap 382 having a second gap dimension runs at the locations of protrusions 500, 350, the second gap dimension being smaller than the first gap dimension. A uniform second gap dimension (in the case of an ideally centered sensor) is defined for a cutting plane transversely to first axis 260 as half the difference between second inside diameter (D2) of through-passage 210 and protrusion diameter (D22) of the sensor housing, i.e., the diameter at the location of protrusions, i.e. (D2-D22)/2. Since the second gap dimension is smaller than the first gap dimension, the ability of the sensor to rotate about the rotation center 325 is limited in the angular space since protrusions 500, 350 already come into contact with inner wall 212 of through-passage 210 in the case of a small rotation and thus prevent further rotation. However, since protrusions 500, 350 are not situated until protrusion area 313, for example, plug-in gap 380 having its first gap dimension is present over the predominant portion in plug-in direction (z) during the plug-in process, so that the plug-in process may be carried out easily and without friction.

Figure 3F:
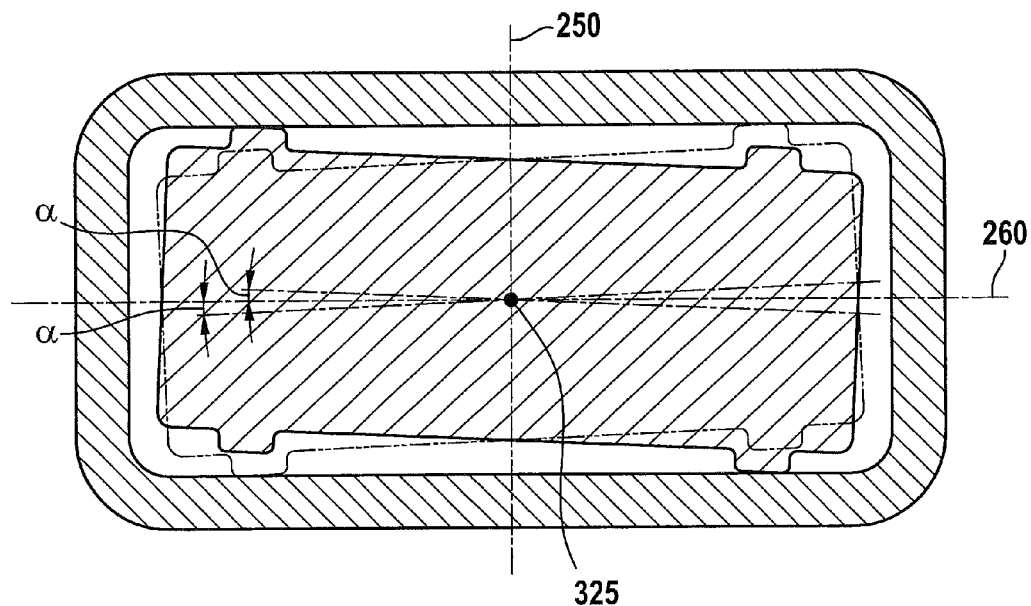
FIG. 3f shows a cross section through the through-passage of the first exemplary embodiment with the plugged-in sensor in the positions of maximal possible rotation about the z-axis.

As in FIG. 3e, FIG. 3f shows sensor 300 in the state in which it is plugged into through-passage 210. However, the figure shows the maximal possible deviation, regarding a rotation about rotation center 325, in the angular position of sensor 300 compared to its setpoint angular position, in which the sensor is oriented in parallel to first axis (260) along its first sensor diameter (D11) and in parallel to second axis 250 along its second sensor diameter (D21) (FIG. 3e). The maximal tolerance degree, i.e., the maximal angular deviation ($\alpha$), with respect to the setpoint angular position is, for example, less than 0.5°, which may be less than 0.35°, and most particularly less than 0.15°.

For the sake of clarity, the two attachment bases 220 and screws 390 have been omitted in FIGS. 3c through 3f.

In the shown exemplary embodiment, two protrusions 500, 350 are situated in each case on each of the two sides of outer wall 370 of sensor housing 310 which extend along first axis 260. Along first axis 260, protrusions 500, 350 situated in each case on the same side have a distance dimension (M), which may be greater than half the first inside diameter (D1) of through-passage 210.

For specific embodiments not shown here in which also at least two protrusions 500, 350 are situated on the sides of outer wall 370 of the sensor housing which extend along second axis 250, their distance dimension may be greater than half the second inside diameter (D2) of through-passage 210.

It is basically also conceivable that two protrusions 500, 350 are situated in the extension direction along first axis 260 on the one side of outer wall 370 of sensor housing 310, and only one protrusion 500, 350 is situated on the other side of outer wall 370. In this case, this one protrusion 500, 350 may be situated approximately centrally between the two other protrusions 500, 350, viewed with respect to a projection onto first axis 260.

FIGS. 4a through 4d show a further specific embodiment of system 100 according to the present invention for rotationally securely plugging a sensor 300 into a through-passage 210 of a flow channel 200. In this specific embodiment, protrusions 500 of system 100 are configured as protrusions 280 on inner wall 212 of through-passage 210.

In this specific embodiment as well, protrusions 500, 280 have insertion tapers, the taper here extending in a wedge shape, viewed in plug-in direction (z).

Figure 4A:
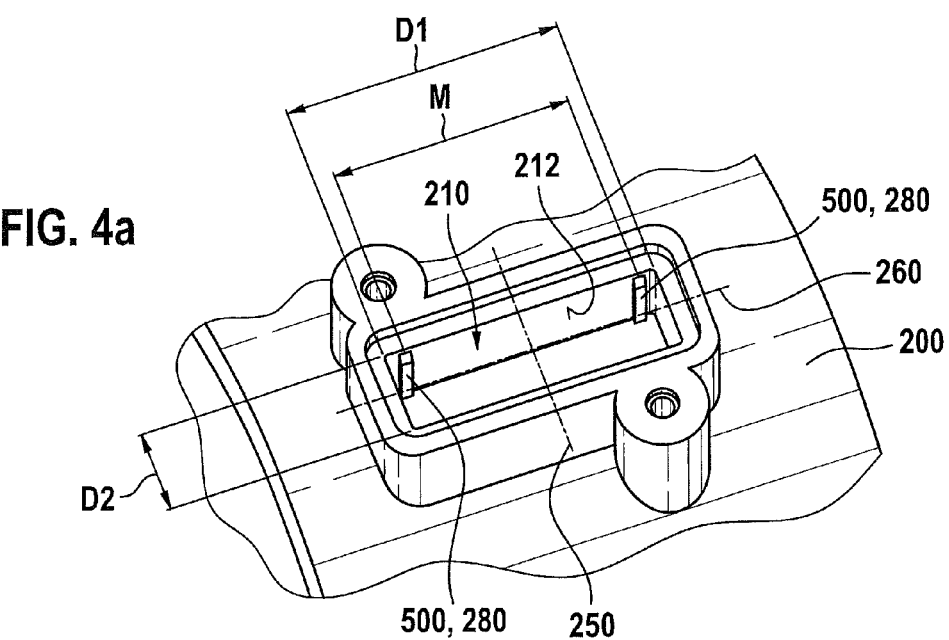
FIG. 4a shows a perspective view of the through-passage of a system according to the present invention for rotationally securely plugging in a sensor according to a second exemplary embodiment.
Figure 4B:
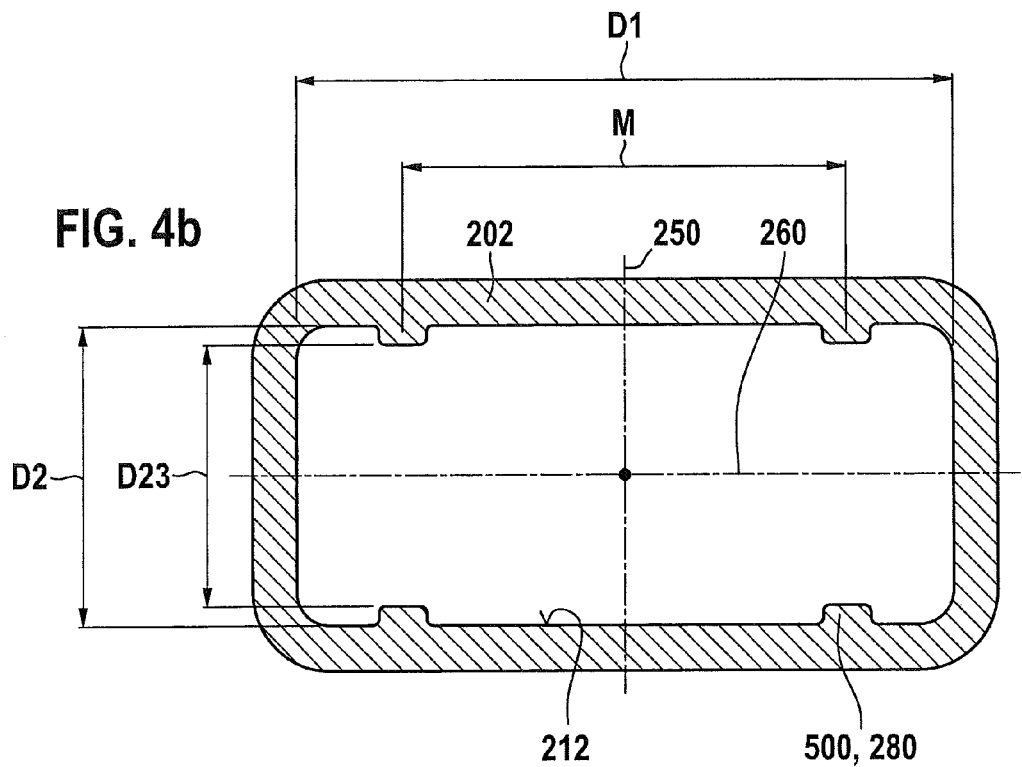
FIG. 4b shows a cross section through the through-passage of the second exemplary embodiment in the state without the assembled sensor.

In FIG. 4b, through-passage 210 is shown in a cross section through base 202 in the top portion of the figure, without sensor 300 being plugged in. For the sake of better clarity, attachment bases 220 from FIGS. 1 and 2 have been omitted. Four protrusions 500, 280 are apparent in this cross section as protrusions 500, 280 projecting into the interior of through-passage 210. In the shown exemplary embodiment, protrusions 500, 280 are situated in each case in pairs on each side of inner wall 212 of through-passage 210 or of base 202 which extends along first axis 260. Second inside diameter (D2) of through-passage 210 is thus smaller at the location of protrusions 500, 280, i.e., a protrusion inside diameter (D23), than at those locations at which no protrusions 500, 280 are situated.

Figure 4C:
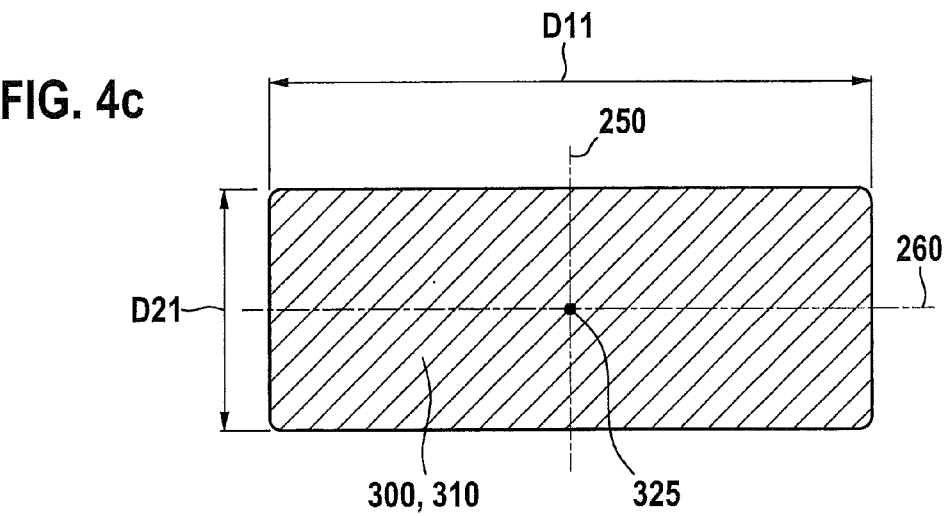
FIG. 4c shows a cross section through the sensor housing of the second exemplary embodiment.

FIG. 4c shows a cross section transversely to third axis 110 of unassembled sensor 300 or of sensor housing 310 in a section of longitudinal extension area 312, which is situated in base 202 in the fully assembled state. In this exemplary embodiment, the sensor has no protrusions.

FIG. 4d shows through-passage 210 having a plugged-in sensor housing 310, which is made of plastic, for example. Outer contour 372 of outer wall 370 of sensor housing 310 is situated completely inside through-passage 210 at all locations. As a result, a plug-in gap 380 surrounding sensor housing 310 is formed between outer contour 372 of sensor housing 310 and inner wall 212 of the through-passage, analogously to the exemplary embodiment from FIGS. 3c through 3e. At the location of protrusions 500, 280, however, protrusion inside diameter (D23) of through-passage 210 is smaller due to protrusions 500, 280 than second sensor diameter (D21) formed at this location along second axis 250 of sensor housing 310. During a rotation about rotation center 325, outer wall 370 of sensor housing 310 consequently comes into contact with protrusions 500, 280 of inner wall 212 of through-passage 210 at the location of protrusions 500, 280, whereby further rotation is prevented.

In other specific embodiments, which are not shown here, it is also conceivable for protrusions 500 to be simultaneously situated both on inner wall 212 of through-passage 210 and on outer wall 370 of sensor housing 310. The decisive aspect for the particular configuration of system 100 or of protrusions 500 in system 100 is how particularly easy centering or orientation of sensor 300 regarding the angular position of sensor 300 is achievable for the particular application, or how the deviation of sensor 300 in the final angular position compared to its setpoint angular position may be minimized. The production environment also plays an important role.

A material, such as hard plastics or metals, which under the application of force, exhibits what may be a small elastic, and in particular small plastic, deformation, is suitable for forming inner wall 212 of through-passage 210 or outer wall 370 of sensor housing 310 to achieve a particularly good function of system 100.

What is claimed is:

1. A sensor system for rotationally securely plugging a sensor into a through-passage of a flow channel, comprising:
   a sensor arrangement including a sensor housing, the through-passage having an inner wall delimiting the through-passage, the through-passage having a first inside diameter extending along a first axis and a second inside diameter extending along a second axis which is perpendicular to the first axis, the first inside diameter being greater than the second inside diameter, a plug-in direction of the sensor housing into the through-passage defining a third axis which is essentially perpendicular to the first axis and the second axis, the sensor housing having a longitudinal extension area along the third axis, the longitudinal extension area having an outer wall, the longitudinal extension area being insertable into the through-passage;
   wherein at least one protrusion is provided so that the sensor housing, in a plugged-in state, which is when the longitudinal extension area is inside the through-passage, is rotatable in the through-passage by no more than 0.5° about the third axis, the at least one protrusion (a) being provided on the inner wall of the through-passage and projecting inwardly from the inner wall of the through-passage into the through-passage or (b) being provided on the outer wall of the longitudinal extension area of the sensor housing so that, in the plugged-in state, the at least one protrusion projects inside the through-passage, outwardly away from the outer wall of the longitudinal extension area, and towards the inner wall of the through-passage.

2. The system of claim 1, wherein the at least one protrusion on the inner wall of the through-passage is situated on at least one inner wall surface extending along the first axis and the third axis and/or the at least one protrusion on the outer wall of the longitudinal extension area of the sensor housing is situated on at least one outer wall surface extending along the first axis and the third axis.

3. The system of claim 1, wherein the projection of the at least one protrusion is by at least 200 micrometers.

4. The system of claim 1, wherein the at least one protrusion extends along the third axis by 1 mm or more.

5. The system of claim 1, wherein there are at least two protrusions.

6. The system of claim 5, wherein the at least two protrusions are each provided on the inner wall of the through-passage or on the outer wall of the longitudinal extension area of the sensor housing, the at least two protrusions being spaced apart from each other, viewed along the first axis, by a distance dimension which is greater than half the first inside diameter.

7. The system of claim 5, wherein the at least two protrusions on the inner wall of the through-passage are situated on a line which is parallel to the direction of the second axis and/or the at least two protrusions on the outer wall of the longitudinal extension area of the sensor housing are situated on a line which is parallel to the direction of the second axis.

8. The system of claim 1, wherein the at least one protrusion has an insertion taper along the plug-in direction.

9. The system of claim 1, wherein the sensor housing, in the plugged-in state, is rotatable in the through-passage by no more than 0.35° about the third axis.

10. A sensor system for detecting an air mass flowing in a channel, comprising:
a sensor device for rotationally securely plugging a sensor into a through-passage of a flow channel, including:
a sensor arrangement including a sensor housing, the through-passage having an inner wall delimiting the through-passage, the through-passage having a first inside diameter extending along a first axis and a second inside diameter extending along a second axis which is perpendicular to the first axis, the first inside diameter being greater than the second inside diameter, a plug-in direction of the sensor housing into the through-passage defining a third axis which is essentially perpendicular to the first axis and the second axis, the sensor housing having a longitudinal extension area along the third axis, the longitudinal extension area having an outer wall, the longitudinal extension area being insertable into the through-passage;
wherein at least one protrusion is provided so that the sensor housing, in a plugged-in state, which is when the longitudinal extension area is inside the through-passage, is rotatable in the through-passage by no more than 0.5° about the third axis, the at least one protrusion (a) being provided on the inner wall of the through-passage and projecting inwardly from the inner wall of the through-passage into the through-passage or (b) being provided on the outer wall of the longitudinal extension area of the sensor housing so that, in the plugged-in state, the at least one protrusion projects inside the through-passage, outwardly away from the outer wall of the longitudinal extension area, and towards the inner wall of the through-passage.

* * * * *